(12) United States Patent
Yang

(10) Patent No.: US 7,573,941 B2
(45) Date of Patent: Aug. 11, 2009

(54) CIRCUIT FOR GENERATING DYING GASP SIGNALS AND ELECTRONIC DEVICE UTILIZING THE SAME

(75) Inventor: Shun-Chen Yang, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 637 days.

(21) Appl. No.: 11/323,126

(22) Filed: Dec. 30, 2005

(65) Prior Publication Data

US 2007/0041436 A1    Feb. 22, 2007

(30) Foreign Application Priority Data

Aug. 19, 2005    (TW) ............... 94128502 A

(51) Int. Cl.
*H04B 3/00*    (2006.01)
(52) U.S. Cl. ...................... 375/257; 375/222
(58) Field of Classification Search ........ 375/377, 375/222; 713/300; 327/61, 194, 554
See application file for complete search history.

(56) References Cited

U.S. PATENT DOCUMENTS

| | | | | |
|---|---|---|---|---|
| 5,523,868 A | * | 6/1996 | Hawley | .................. 398/38 |
| 5,561,384 A | * | 10/1996 | Reents et al. | .................. 327/108 |
| 6,647,117 B1 | | 11/2003 | Wallace et al. | |
| 2003/0035377 A1 | | 2/2003 | Ju | |
| 2004/0201413 A1 | * | 10/2004 | Mercier | ...................... 327/493 |

FOREIGN PATENT DOCUMENTS

| | | |
|---|---|---|
| CN | 1438788 A | 8/2003 |
| CN | 1485705 A | 3/2004 |
| TW | 364690 | 7/1999 |
| TW | 562286 | 11/2003 |
| TW | 595199 | 6/2004 |
| WO | WO 2004/040891 A2 | 5/2004 |

* cited by examiner

*Primary Examiner*—David C Payne
*Assistant Examiner*—Rahel Guarino
(74) *Attorney, Agent, or Firm*—Frank R. Niranjan

(57) ABSTRACT

An exemplary circuit for generating dying gasp signals (30) includes a power loss detecting circuit (320), a Digital Signal Processor (DSP) (310), a unipolar switch circuit (330), and a capacitor (C1). The power loss detecting circuit is used for detecting power loss statuses and generating interrupt signals, and includes a first input end. The DSP is connected to the power loss detecting circuit, and is used for generating dying gasp signals according to the interrupt signals. The unipolar switch circuit includes a second input end connected to the first input end of the power loss detecting circuit, and a first output end connected to the DSP. The capacitor includes one end connected to the first output end of the unipolar switch circuit, and another end connected to ground.

13 Claims, 1 Drawing Sheet

US 7,573,941 B2

CIRCUIT FOR GENERATING DYING GASP SIGNALS AND ELECTRONIC DEVICE UTILIZING THE SAME

BACKGROUND

1. Field of the Invention

The present invention relates to electronic devices, and particularly to an electronic device comprising a circuit for generating dying gasp signals.

2. Related Art

The growing requirements for internet data have increased the popularity of broadband access services. Digital Subscriber Line (DSL) technology has become a main broadband access technology in the world due to its convenient deployment, good performance and lower cost.

Asymmetrical Digital Subscriber Line (ADSL) is the most popular kind of DSL technology. In a typical application, a Customer's Premises Equipment (CPE) is usually configured, controlled, maintained and upgraded by a Central Office (CO). The International Telecommunications Union (ITU) standard G.992.1 of ADSL prescribes that when an ADSL CPE runs out of power, the ADSL CPE must generate dying gasp signals, and send the dying gasp signals to an ADSL CO via an Embedded Operation Channel (EOC).

However, if the ADSL CPE is completely without power, it cannot send out dying gasp signals. Therefore power saving elements, for example capacitors, are used for supplying power to generate dying gasp signals. Capacitors with high capacitance are needed in order to supply sufficient power. Thus, there is generally enough time for an ADSL CPE to generate dying gasp signals and send the dying gasp signals to the ADSL CO. Nevertheless, capacitors with high capacitance increase the cost of the ADSL CPE. In addition, the capacitors take up more space on a printed circuit board, and thus make the layout of the printed circuit board problematic. Furthermore, the increased capacitance increases burst currents, and the ADSL CPE is liable to easily break down. Capacitors with high capacitance are also liable to reduce sensibility of power-down detection in the same circuit and delay the immediate use of time for generation of the dying gasp signals.

SUMMARY

An exemplary embodiment of the present invention provides a circuit for generating dying gasp signals. The circuit includes a power loss detecting circuit, a Digital Signal Processor (DSP), a unipolar switch mechanism, and a capacitor. The power loss detecting circuit is used for detecting power loss statuses and generating interrupt signals, and includes a first input end. The DSP is connected to the power loss detecting circuit, and is used for generating dying gasp signals according to the interrupt signals. The unipolar switch mechanism includes a second input end connected to the first input end of the power loss detecting circuit, and a first output end connected to the DSP. The capacitor includes one end connected to the first output end of the unipolar switch mechanism, and another end connected to ground.

Another exemplary embodiment of the present invention provides an electronic device. The electronic device includes a power supply and a circuit for generating dying gasp signals. The circuit includes a power loss detecting circuit, a Digital Signal Processor (DSP), a unipolar switch mechanism, and a capacitor. The power loss detecting circuit is for detecting power loss statuses and generating interrupt signals, and includes a first input end. The DSP is connected to the power loss detecting circuit, and is used for generating dying gasp signals according to the interrupt signals. The unipolar switch mechanism includes a second input end commonly connected to the first input end of the power loss detecting circuit and the power supply, and a first output end connected to the DSP. The capacitor includes one end connected to the first output end of the unipolar switch mechanism, and another end connected to ground.

When there is no power supplied to the circuit for generating dying gasp signals, the unipolar switch mechanism is shut down immediately, and the capacitor only releases power to the DSP. Therefore, the DSP has enough time to generate dying gasp signals.

Other advantages and novel features will become more apparent from the following detailed description when taken in conjunction with the accompanying drawings, in which:

DETAILED DESCRIPTION OF THE EMBODIMENTS

Figure 1:
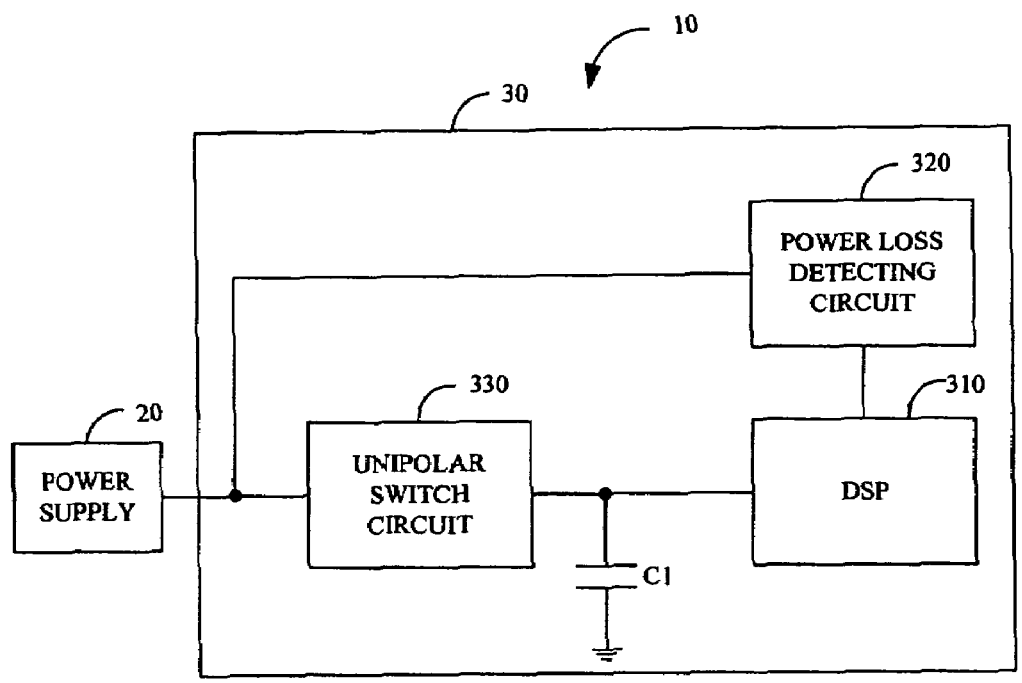
FIG. 1 is a block diagram of an electronic device utilizing a circuit for generating dying gasp signals of an exemplary embodiment of the present invention.

FIG. 1 is a block diagram of an electronic device 10 utilizing a circuit for generating dying gasp signals 30 (hereinafter the circuit 30) of an exemplary embodiment of the present invention. In the exemplary embodiment, the electronic device 10 may for example be an Asymmetrical Digital Subscriber Line (ADSL) device. The electronic device 10 includes a power supply 20 and the circuit 30. The power supply 20 provides power to the circuit 30. In the exemplary embodiment, the circuit 30 includes a Digital Signal Processor (DSP) 310, a power loss detecting circuit 320, a unipolar switch mechanism 330 functioning as an isolator, and a capacitor C1 used as a power saving element. In the exemplary embodiment, the unipolar switch mechanism 330 is a unipolar switch circuit 330.

The power loss detecting circuit 320 includes a first input end connected to the power supply 20. The power loss detecting circuit 320 is used for detecting power loss statuses, generating interrupt signals, and sending the interrupt signals to the DSP 310 when there is no power supplied from the power supply 20 to the circuit 30. The DSP 310 is connected to the power loss detecting circuit 320, and is used for generating dying gasp signals according to the interrupt signals. The unipolar switch circuit 330 includes a second input and a first output. The second input is commonly connected to the first input of the power loss detecting circuit 320 and to the power supply 20, and the first output is connected to the DSP 310. The capacitor C1 includes one end connected to the first output, and another end connected to ground. When a voltage of the second input of the unipolar switch circuit 330 is higher than that of the first output of the unipolar switch circuit 330, the unipolar switch circuit 330 is turned on; otherwise, the unipolar switch circuit 330 is shut down. The power loss detecting circuit 320 also includes a second output end connected to the DSP 310.

When the power supply 20 works normally, the unipolar switch circuit 330 is turned on, the power supply 20 provides power to the DSP 310, and the capacitor C1 saves power. When the power supply 20 runs out of power, the power loss detecting circuit 320 detects the power loss status of the power supply 20, generates an interrupt signal, and sends the interrupt signal to the DSP 310. At the same time, the unipolar switch circuit 330 is shut down, and the capacitor C1 releases power to the DSP 310. The DSP 310 generates a dying gasp signal according to the interrupt signal.

Figure 2:
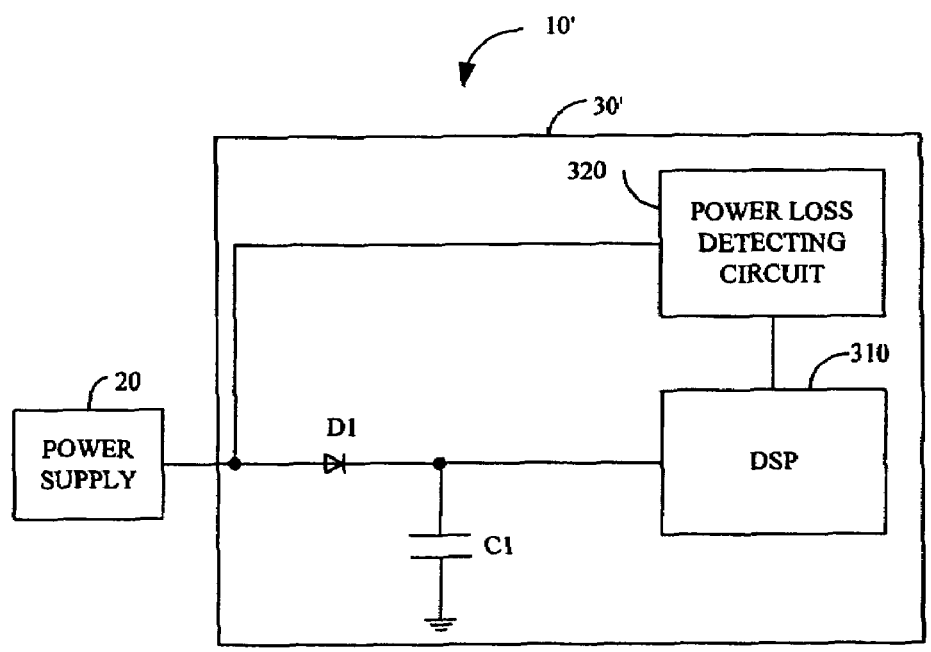
FIG. 2 is a block diagram of an electronic device utilizing a circuit for generating dying gasp signals of another exemplary embodiment of the present invention.

FIG. 2 is a block diagram of an electronic device 10' utilizing a circuit for generating dying gasp signals 30' (hereinafter the circuit 30') of another exemplary embodiment of the present invention. The circuit 30' includes a diode D1, instead of having the unipolar switch circuit 330 of the above-described circuit 30. An anode of the diode D1 is a second input end, and a cathode of the diode D1 is a first output end. In other exemplary embodiments, the unipolar switch circuit 330 may include one or more transistors or Metal-Oxide-Semiconductor Field Effect Transistors (MOSFETs).

When the circuit 30 or 30' loses power, the unipolar switch circuit 330 or the diode D1 thereof is shut down. Therefore, the capacitor C1 only releases power to the DSP 310. Accordingly, the DSP 310 has enough time to generate dying gasp signals after the power loss detecting circuit 320 detects a power loss status in real time.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

I claim:

1. A circuit for generating dying gasp signals, comprising:
    a power loss detecting circuit for detecting power loss statuses and generating interrupt signals, the power loss detecting circuit comprising a first input end;
    a Digital Signal Processor (DSP) connected to the power loss detecting circuit, for generating dying gasp signals according to the interrupt signals;
    a unipolar switch mechanism comprising a second input end connected to the first input end of the power loss detecting circuit, and a first output end connected to the DSP, wherein the unipolar switch circuit is turned on when voltage of the second input is higher than that of the first output, and is shut down when voltage of the second input is not higher than that of the first output; and
    a capacitor comprising one end connected to the first output end of the unipolar switch mechanism, and another end connected to ground.

2. The circuit for generating dying gasp signals as claimed in claim 1, wherein the second input end of the unipolar switch mechanism is for connection to a power supply in addition to being connected to the first input end of the power loss detecting circuit.

3. The circuit for generating dying gasp signals as claimed in claim 1, wherein the unipolar switch mechanism comprises a unipolar switch circuit.

4. The circuit for generating dying gasp signals as claimed in claim 1, wherein the unipolar switch mechanism comprises a diode.

5. The circuit for generating dying gasp signals as claimed in claim 4, wherein an anode of the diode is the second input end of the unipolar switch mechanism, and a cathode of the diode is the first output end of the unipolar switch mechanism.

6. The circuit for generating dying gasp signals as claimed in claim 1, wherein the power loss detecting circuit further comprises a second output end connected to the DSP.

7. An electronic device comprising:
    a power supply; and
    a circuit for generating dying gasp signals, comprising:
        a power loss detecting circuit for detecting power loss statuses and generating interrupt signals, the power loss detecting circuit comprising a first input end;
        a Digital Signal Processor (DSP) connected to the power loss detecting circuit, for generating dying gasp signals according to the interrupt signals;
        a unipolar switch mechanism comprising a second input end commonly connected to the first input end of the power loss detecting circuit and the power supply, and a first output end connected to the DSP, wherein the unipolar switch mechanism is turned on when voltage of the second input is higher than that of the first output, and is shut down when voltage of the second input is not higher than that of the first output; and
        a capacitor comprising one end connected to the first output end of the unipolar switch mechanism, and another end connected to ground.

8. The electronic device as claimed in claim 7, wherein the unipolar switch mechanism comprises a unipolar switch circuit.

9. The electronic device as claimed in claim 7, wherein the unipolar switch mechanism comprises a diode.

10. The electronic device as claimed in claim 9, wherein an anode of the diode is the second input end of the unipolar switch mechanism, and a cathode of the diode is the first output end of unipolar switch mechanism.

11. The electronic device as claimed in claim 7, wherein the power loss detecting circuit further comprises a second output end connected to the DSP.

12. An electronic device comprising:
    a power supply capable of powering said electronic device;
    a detecting circuit electrically connectable to a power supply for detecting said powering of said power supply and capable of generating signals indicating loss of said powering;
    a processor electrically connectable to said detecting circuit and said power supply respectively so as to be powered by said power supply for processing said signals from said detecting circuit;
    a power saving element electrically connectable between said processor and said power supply, and capable of reserving power from said power supply therein when said powering of said power supply is available and releasing said power to said processor when said powering of said power supply is lost; and
    an isolator electrically connectable between said power saving element and said detecting circuit so as to isolate said detecting circuit from electrical performance of said power saving element, wherein the isolator connects said detecting circuit to the electrical performance of said power saving element when voltage of an input of the isolator is higher than that of an output of the isolator, and isolates said detecting circuit from the electrical performance of said power saving element when voltage of the input of the isolator is not higher than that of the output of the isolator.

13. The electronic device as claimed in claim 12, wherein said isolator is a unipolar switch circuit comprising a diode.

* * * * *